(12) United States Patent
Funayama et al.

(10) Patent No.: US 6,804,089 B2
(45) Date of Patent: Oct. 12, 2004

(54) YOKE-TYPE MAGNETIC HEAD AND MAGNETIC RECORDING/REPRODUCING DEVICE

(75) Inventors: Tomomi Funayama, Fujisawa (JP); Yuichi Osawa, Yokohama (JP); Masatoshi Yoshikawa, Yokohama (JP); Hiroaki Yoda, Kawasaki (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 12 days.

(21) Appl. No.: 10/424,844

(22) Filed: Apr. 29, 2003

(65) Prior Publication Data

US 2003/0193757 A1 Oct. 16, 2003

Related U.S. Application Data

(62) Division of application No. 09/583,575, filed on May 31, 2000, now Pat. No. 6,606,225.

(30) Foreign Application Priority Data

May 31, 1999 (JP) .......................................... 11-152858

(51) Int. Cl.⁷ .............................................. G11B 5/27
(52) U.S. Cl. .................................................... 360/321
(58) Field of Search ........................................ 360/321

(56) References Cited

U.S. PATENT DOCUMENTS

| | | | | |
|---|---|---|---|---|
| 4,343,026 A | * | 8/1982 | Griffith et al. ............... | 360/113 |
| 4,644,430 A | * | 2/1987 | French ......................... | 360/113 |
| 5,043,693 A | * | 8/1991 | Edelstein ................... | 338/32 R |
| 5,268,043 A | * | 12/1993 | McCowen ................... | 148/310 |
| 6,016,241 A | * | 1/2000 | Coffey et al. ................ | 360/113 |
| 6,134,079 A | * | 10/2000 | Koshikawa .................. | 360/126 |
| 6,456,466 B1 | * | 9/2002 | Nakamoto et al. ........... | 360/319 |

* cited by examiner

Primary Examiner—David Davis
(74) Attorney, Agent, or Firm—Oblon, Spivak, McClelland, Maier & Neustadt, P.C.

(57) ABSTRACT

The objective of this invention is to provide a yoke-type magnetic head and a magnetic recording device in which Barkhausen noise is low. It is possible to induce a magnetic flux efficiently within a magnetic head by using a granular magnetic film that exhibits both soft magnetic properties and a high resistance, which suppresses any shunt of the flow of the sense current into the magnetic yokes, thus preventing any deterioration insensitivity. Since this means that eddy currents can be suppressed, even during use in high-frequency regions, the frequency response characteristics are also improved. In addition, since the magnetic grains within the granular magnetic film are nano-sized, the dimensions of magnetic domains therein are also miniaturized to match that size, and thus there is also substantially no movement of the magnetic domain walls and this miniaturization also makes it possible to suppress the generation of Barkhausen noise. A similar effect can also be obtained by inducing maze domains within the magnetic yokes.

10 Claims, 12 Drawing Sheets

Proportion of insulating material AlOx in granular (CoFe)(AlOx) structure

# YOKE-TYPE MAGNETIC HEAD AND MAGNETIC RECORDING/REPRODUCING DEVICE

BACKGROUND OF THE INVENTION

The present invention relates to a magnetic head and a magnetic recording/reproduction device, and, more specifically, to a magnetic head and a magnetic recording/reproduction device wherein Barkhausen noise is suppressed and high-density recording is enabled.

It is expected that magnetic recording/reproduction devices, such as hard disk drives (HDDs), will achieve even greater densities in the future as the recent trends towards smaller sizes and higher densities proceeds. To increase densities in magnetic recording, it is necessary to increase the recording track density by narrowing the "recording track width" and also to increase the recording density in the longitudinal direction, in other words, the "linear recording density."

To ensure that a sufficiently large reproduction signal output is obtained even when the recording track width has been reduced and also the magnitude of the magnetization used for recording has been reduced, the anisotropic magneto-resistance effect (AMR) is utilized to develop AMR heads, which have high reproduction sensitivity and are now in use. Giant magneto-resistance (GMR) has recently been utilized to develop even more sensitive spin-valve GMR heads for use, which has been realized to enable even higher reproduction sensitivities. Research is also progressing into magnetic heads that utilize tunnelling magneto-resistance (TMR).

The development and use of magnetic heads with such high levels of reproduction sensitivity has made it possible to reproduce recording signals even from extremely narrow recording track widths.

However, in order to increase the linear recording density, which is the density in the longitudinal direction of a recording track, it is necessary to reduce the gap of the magnetic head. In a prior-art magnetic head that uses a magneto-resistance effect element, a magneto-resistance effect element is inserted within a head gap. The thickness of the magneto-resistance effect element must be 20–30 nm, even with an AMR head or a spin-valve GMR head, and it is necessary to provide a distance of about 100 nm between the two shields, from consideration of insulation between the sensing element and the shields. This means that there is a large limitation on increases in linear recording density.

This problem can be solved by using a structure called a "magnetic yoke."

A schematic view of the structure of a yoke-type magnetic head is shown in FIG. 22. This yoke-type magnetic head has a pair of magnetic yokes 202 with a magnetic field detection sensor 204 connected therebetween. A gap 206 is provided in the close vicinity of the ends of the magnetic yokes 202. A magneto-resistance effect element can be used as the magnetic field detection sensor 204, by way of example.

In other words, the magneto-resistance effect element 204 is moved away from the gap 206 of the magnetic head to make it possible to ensure that the head gap is sufficiently narrow. The signal flux F from the recording medium is taken in by the head gap portion and is guided by the magnetic yokes 202, then is transferred to the magneto-resistance effect element 204 that is located at a rear portion of the magnetic head, so that the reproduction signal can be obtained from this magneto-resistance effect element 204.

Since this yoke-type magnetic head makes it possible to ensure that the head gap is sufficiently small, it is possible to increase the resolution of reproduction and thus respond to a high linear recording density. With respect to track density, the reproduction track width in the prior-art device is determined by the spacing of leads disposed on either the of the magneto-resistance effect element 204, to supply a sense current thereto, but with a yoke-type device it is possible to determine the track width by the film thickness of the magnetic yokes 202 and thus it is simpler to reduce the track width than in the prior-art device. This feature is another reason why the yoke-type magnetic head can be expected to enable sufficient respond to higher recording densities in the future.

With a yoke-type magnetic head, however, the magnetic domain walls within the magnetic material used for the magnetic yokes 202 move discontinuously. As a result, the transfer of magnetic flux is passed on to the magneto-resistance effect element 204 in a discontinuous manner, which therefore leads to large amounts of Barkhausen noise in the reproduction output from the magneto-resistance effect element 204. This noise is so great, it creates a large obstacle to the implementation of a magnetic head using such magnetic yokes 202.

With a magnetic head that uses the magnetic field detection sensor 204, it is necessary to supply a sense current to the magnetic field detection sensor 204. However, with a yoke-type device, the flow of this sense current tends to shunt into the magnetic yokes 202 from the magnetic field detection sensor 204, leading to a deterioration in sensitivity. If an insulating film of a material such as alumina is disposed between the magnetic yokes 202 and the magnetic field detection sensor 204 in order to prevent this, the "propagation" of magnetic flux through that portion will worsen, which causes a problem in that the same sort of deterioration insensitivity occurs.

As described above, the yoke-type magnetic head of the prior art has problems in that Barkhausen noise is generated by discontinuous movement of the magnetic domain walls in the magnetic yokes 202, and sensitivity deteriorates, either due to the worsening of the "propagation" of magnetic flux between the magnetic yokes 202 and the magnetic field detection sensor 204 or due to shunting of the flow of sense current.

The present invention was devised in recognition of these technical problems. In other words, an objective of this invention is to provide a magnetic head and a magnetic recording/reproduction device that uses the same, wherein the generation of Barkhausen noise is suppressed while, at the same time, there is no deterioration of sensitivity.

SUMMARY OF THE INVENTION

In other words, a magnetic head in accordance with the present invention comprises:
- a magnetic yoke taking in a signal flux from a magnetic recording medium, the magnetic yoke having a first yoke member, a second yoke member and a magnetic gap, the magnetic gap being located between the first and second yoke members; and
- a magneto-resistance effect element detecting the signal flux transferred from the magnetic yoke, wherein the signal flux is transferred to the magneto-resistance effect element via a granular magnetic film.

In this case, a "granular magnetic film" is a thin film of a material that has a granular structure wherein minute magnetic metal particles are surrounded by a material having non-magnetic properties.

Another magnetic head in accordance with the present invention relates to a magnetic head comprising:
- a magnetic yoke taking in a signal flux from a magnetic recording medium, the magnetic yoke having a first yoke member, a second yoke member and a magnetic gap, the magnetic gap being located between the first and second yoke members; and a magneto-resistance effect element detecting the signal flux transferred from the magnetic yoke, wherein the first and second yoke members have a plurality of magnetic domains, each of the magnetic domains having a main magnetization direction parallel or antiparallel to a first direction.

A preferred embodiment of the present invention is provided with magnetic yokes having a magnetic gap interposed therebetween on a medium-facing surface thereof, and a magneto-resistance effect element formed at a position that is a predetermined distance further backward than the medium-facing surface, wherein the magnetic yokes comprise a granular magnetic film or a granular magnetic film is interposed between the magnetic yokes and the magneto-resistance effect element.

The "medium-facing surface" corresponds to the "air-bearing surface" if the magnetic head is of a "floating sliding" type, and corresponds to the "medium-contacting surface" if the magnetic head is of a "contact sliding" type.

A further aspect of this invention is provided with magnetic yokes having a magnetic gap interposed therebetween on a medium-facing surface thereof, and a magneto-resistance effect element formed at a position that is a predetermined distance further backward than the medium-facing surface, wherein the magnetic yokes are formed of a multi-layer film structure of a antiferromagnetic film and a granular magnetic film.

A still further aspect of this invention is provided with magnetic yokes having a magnetic gap interposed therebetween on a medium-facing surface thereof, and a magneto-resistance effect element formed at a position that is a predetermined distance further backward than the medium-facing surface, wherein magnetic domains within the magnetic yokes are miniaturized.

An even further aspect of this invention is provided with magnetic yokes having a magnetic gap interposed therebetween on a medium-facing surface thereof, and a magneto-resistance effect element formed at a position that is a predetermined distance further backward than the medium-facing surface, wherein the orientation of an anisotropic magnetic field of the magnetic yokes is substantially uniform.

Yet another aspect of this invention is provided with magnetic yokes having a magnetic gap interposed therebetween on a medium-facing surface thereof, and a magneto-resistance effect element formed at a position that is a predetermined distance further backward than the medium-facing surface; wherein the orientation of an anisotropic magnetic field of the magnetic yokes is in a radiating form.

Still another aspect of the present invention relates to a magnetic head comprising at least a pair of magnetic yokes disposed within substantially the same surface, with a magnetic gap formed between contact surfaces of those magnetic yokes, wherein the main magnetization direction of the magnetic yokes is inclined within the yoke surface.

In yet another aspect of the invention, the magnetic domains formed within the yokes are maze domains. The "maze domains" include magnetic domain structures such as "stripe magnetic domains" and "serpentine-like magnetic domains."

Alternatively, the yokes are formed of a multi-layer structure of at least a ferromagnetic film and an antiferromagnetic film.

Further alternatively, the yokes are formed of a antiferromagnetic material having ferromagnetic crystal grains and an antiferromagnetic material at crystal grain boundaries thereof.

A magnetic recording/reproduction device in accordance with this invention is provided with any one of the previously described magnetic heads, for recording or reproducing information with respect to a magnetic recording medium.

In this case, recording and reproduction of the information is implemented with the magnetic head and the magnetic recording medium in a state in which they are substantially in contact.

The present invention is implemented as described above and exhibits the effects described below.

In other words, the present invention makes it possible to induce a magnetic flux in the magnetic head efficiently, by using a granular magnetic film that has both advantageous soft magnetic properties and a high resistance, and, since the high resistance ensures that substantially no sense current flows into the magnetic yoke, there is substantially no deterioration in the sensitivity. It is also possible to suppress eddy currents, even when used in high-frequency regions, so the frequency response characteristics are also improved.

Furthermore, since the magnetic grains within the granular magnetic film are nano-sized, the dimensions of magnetic domains therein are also miniaturized to match that size, and thus there is also substantially no movement of the magnetic domain walls and this miniaturization also makes it possible to suppress the generation of Barkhausen noise. It is also possible to induce magnetic anisotropy in the structure by subjecting it to thermal processing within a magnetic field or by forming films within a magnetic field. In particular, it is possible to make the orientation of an anisotropic magnetic field substantially uniformby performing thermal processing within a rotational magnetic field or forming a granular magnetic film within a rotational magnetic field. That is to say, it would be extremely convenient if a film that is isotropic from the magnetic point of view could be created, to form a closed magnetic path. Similarly, it is also possible to subject the structure to radial magnetic anisotropy to induce radial magnetic anisotropy, in which case, the flow of magnetic flux is always excited along the axis of difficulty, increasing the linear response characteristics and also improving the frequency response characteristics.

The present invention also makes it possible to guide magnetic flux efficiently into the magneto-resistance effect element, while maintaining the insulation thereof, by inserting a granular magnetic film between the magnetic yoke and the magneto-resistance effect element. In that case, it becomes possible to use a soft magnetic metal film such as a film of NiFe or CoZrNb as the magnetic yoke.

In addition, the present invention makes it possible to suppress movement of the magnetic domain walls, and thus suppress the generation of Barkhausen noise, by forming the magnetic yoke of a multi-layer film consisting of an antiferromagnetic film and a granular magnetic film and because the magnetization of the granular magnetic film is focused within each magnetic domain by the exchange coupling thereof with the antiferromagnetic film. It is therefore possible to prevent the generation of Barkhausen noise even when magnetic isotropy is induced by thermal processing within a rotational magnetic field or film formation within a magnetic field.

If an antiferromagnetic film is superimposed on the structure, exchange couplings with the antiferromagnetic film can be used to induce radial magnetic anisotropy, even at lower temperatures and with weaker currents. In such a case, the flow of magnetic flux is always excited along the axis of difficulty, increasing the linear response characteristics and also improving the frequency response characteristics.

The present invention also induces magnetization that is orientated in a direction that is substantially perpendicular to the magnetic yoke surfaces, so that it is basically not magnetic anisotropy within the surface but isotropy. In other words, isotropic permeability is obtained thereby. As the magnetization approaches the perpendicular orientation even further, maze domains are formed. These magnetic domains are extremely small in comparison with the magnetic flux paths, so that changes in the magnetic domains are difficult to perceive as Barkhausen noise. It is also possible to prevent any variation with time in the magnetic domain state of the maze domains that are formed by the coupling of the soft magnetic film and the antiferromagnetic film of the yoke.

The present invention also makes it possible to implement a high-density, low-noise magnetic recording/reproduction device by using anyone of the above described magnetic heads, which has huge industrial advantages.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DETAILED DESCRIPTION OF PREFERRED EMBODIMENTS

Embodiments of the present invention are described in detail below, with reference to the accompanying drawings. First Embodiment This embodiment of the invention provides a magnetic head wherein signal flux from magnetic yokes is transferred to the previously described magneto-resistance effect element through a "granular magnetic film." In other words, it is possible to achieve both a high sensitivity and a low level of noise, by forming components such as the magnetic yokes from a "granular magnetic film."

Figure 1:
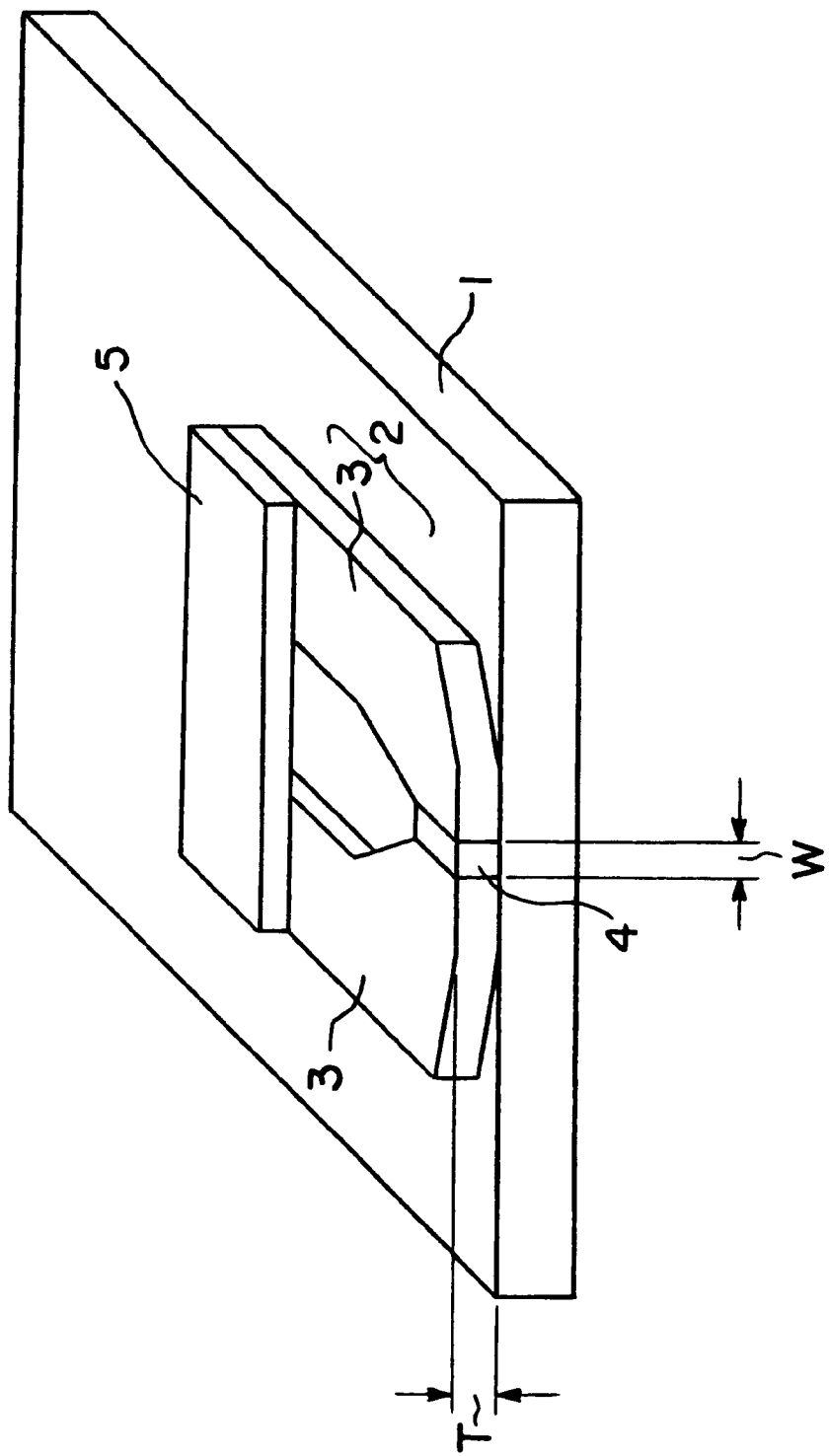
FIG. 1 is a schematic view exemplifying the structure of a magnetic head in accordance with a first embodiment of the present invention.

A schematic view of the configuration of a magnetic head in accordance with the first embodiment of the present invention is shown in FIG. 1. This figure is a perspective view as seen from a facing surface with respect to a magnetic recording medium (not shown in the figure), wherein a pair of magnetic yokes 2 is formed on top of a substrate 1 of $Al_2O_3$—$TiC/Al_2O_3$ (a multi-layer structure of an aluminum oxide layer superimposed on an ALTIC substrate). Each of the magnetic yokes 2 is formed of a granular magnetic film 3.

The magnetic yokes 2 are formed in parallel in such a manner that they have a common plane surface that is substantially parallel to the substrate surface. The film thickness T of these yokes defines the track width, and could be 0.3 μm, by way of example.

A magnetic gap 4 is present on a surface at the end of the pair of magnetic yokes 2, in other words, on a the thereof that faces a recording medium (not shown in the figure). The magnetic gap 4 defines the gap length, and the width W thereof could be 0.05 μm, by way of example. A non-magnetic material could be used therefor, such as $Al_2O_3$.

A magneto-resistance effect (MR) element 5 is disposed on a plane surface that is substantially parallel to the substrate surface of the magnetic yokes 2, in other words, on a plane surface that is substantially parallel to the magnetic flux passing through the magnetic yokes 2, at a position that is a predetermined distance from the surface facing the recording medium, as will be described later. In other words, the MR element 5 is disposed in such a manner as to be magnetically coupled with both of the pair of magnetic yokes 2. The magnetic yokes 2 and the MR element 5 form an annular magnetic path through the magnetic gap 4. In other words, a signal magnetic field that flows from the recording medium, through the magnetic gap 4, and into the magnetic yokes 2 is guided to the MR element 5 by the magnetic yokes 2.

A film of NiFe, which forms an AMR element, or a CoFe/Cu/CoFe multi-layer film, which forms a spin-valve GMR element, can be used as the MR element 5. Although not shown in FIG. 1, a pair of leads are formed on either the of the MR element 5, to supply a sense current.

One characteristic of this embodiment of the invention is the way in which the magnetic yokes 2 are formed from the granular magnetic film 3. In this case, "granular magnetic film" means a thin film that is formed from a material having a granular structure, wherein a non-magnetic material surrounds minute magnetic metal particles.

Figure 2:
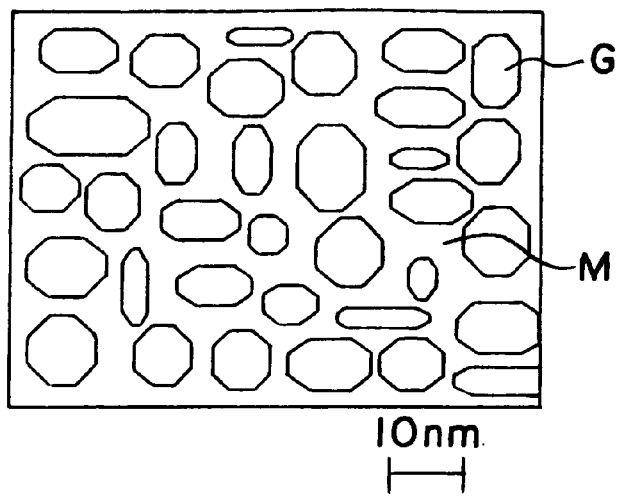
FIG. 2 is a schematic view of the structure of a granular magnetic film.

A schematic view of the structure of this granular magnetic film is shown in FIG. 2. As can be seen from this figure, magnetic grains G of cobalt iron (CoFe) are dispersed within an insulating matrix M of an aluminum oxide ($AlO_X$). The grain size of the magnetic grains G could be between approximately a few nanometers to several tens of nanometers, by way of example.

In general, a granular magnetic film can be expressed by the general formula: T—M—X. In this case, preferable materials in accordance with this invention are selected from one or more of iron (Fe), cobalt(Co), and nickel (Ni) for the element T; one or more of boron (B), aluminum(Al), gallium (Ga), carbon (C), silicon (S), germanium (Ge), lithium (Li),magnesium (Mg), calcium (Ca), strontium (Sr), barium (Ba), zirconium (Zr),hafnium (Hf), scandium (Sc), yttrium (Y), or other rare-earth elements for the element M; and one or more of nitrogen (N), oxygen (O), and fluorine(F) for the element X.

The thickness of this film advantageous for hard magnetic characteristics could be 10 nm to 1000 nm by way of example.

Examples of methods used to form a film of such a granular structure include a simultaneous sputtering method using a target equivalent to the element T in the above mentioned formula and a target that combines the elements M and X, and a reactive sputtering method using a target that combines the elements T and M within an environment comprising the element X.

For example, it is possible to form a granular magnetic film by simultaneous RF magnetron sputtering, using a $Co_{90}Fe_{10}$ target and an $Al_2O_3$ target.

Figure 3:
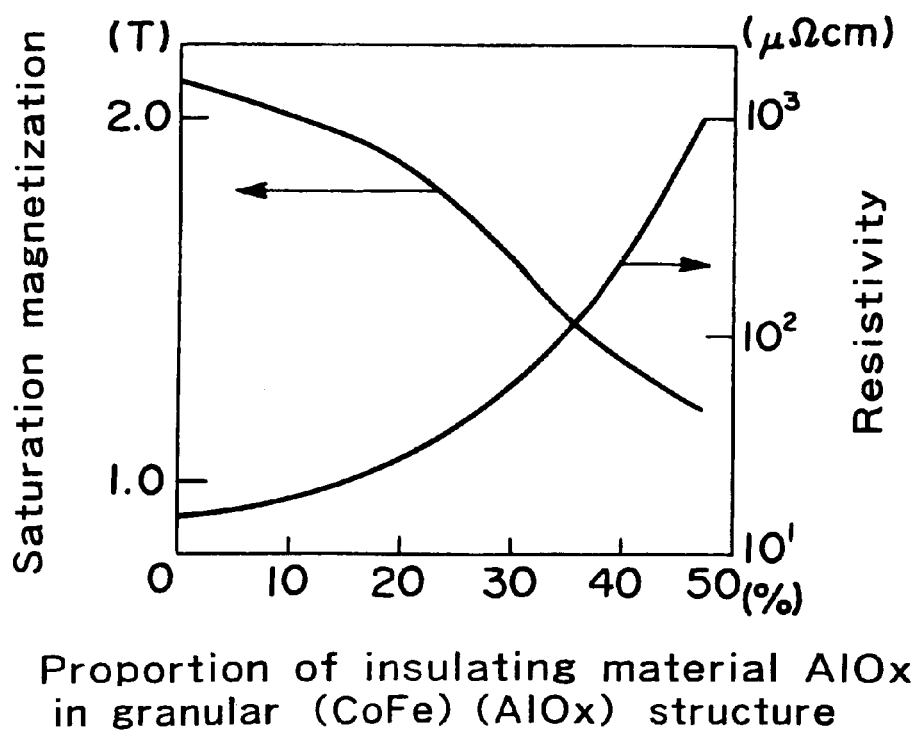
FIG. 3 is a graph of the relationships between the composition of a granular magnetic film and the resistivity and saturation magnetization thereof.

The relationships between the composition of such a granular magnetic film and the resistivity and saturation magnetization are shown graphically in FIG. 3. This graph illustrates a case wherein CoFe is used for the magnetic grains G and $AlO_X$ is used for the insulating matrix M. The proportion (atomic percentage) of $AlO_X$ within the granular magnetic film is plotted along the horizontal axis, saturation magnetization is plotted along the left-hand vertical axis, and resistivity is plotted along the right-hand vertical axis.

As can be understood from FIG. 3, saturation magnetization tends to fall and resistivity rise as the proportion of the insulating matrix increases. It is therefore possible to select both the saturation magnetization and the resistivity by adjusting the ratio of magnetic grains to the insulating matrix as appropriate. In other words, using a granular magnetic film makes it possible to achieve both a suitably soft magnetism and a high resistance.

Forming the magnetic yokes 2 of such a granular magnetic film in this manner makes it possible to guide the magnetic flux efficiently into the magnetic head, because it is softly magnetic, while ensuring that substantially no deterioration in sensitivity is caused because there is substantially no shunting of the sense current into the magnetic yokes, because they have a high resistance.

In addition, the frequency response characteristics are improved since eddy currents are suppressed even in the high-frequency region.

Since the magnetic grains within the granular magnetic film are nano-sized, the dimensions of magnetic domains therein are also miniaturized to match that size, and thus there is also substantially no movement of the magnetic domain walls and this miniaturization also makes it possible to suppress the generation of Barkhausen noise.

It is also possible to induce magnetic anisotropy in the structure by subjecting it to thermal processing within a magnetic field or by forming films within a magnetic field, as will be described in detail later. In other words, it is possible to make the orientation of an anisotropic magnetic field substantially uniform by performing thermal processing within a rotational magnetic field or forming a granular magnetic film within a rotational magnetic field. That is to say, it would be extremely convenient if a film that is isotropic from the magnetic point of view could be created, to form a closed magnetic circuit.

A radial magnetic anisotropy can also be induced by a method such as electrically conductive thermal processing. In such a case, excitation is always in the axis of difficulty along the flow of magnetic flux, increasing the linear response characteristics and also improving the frequency response characteristics.

The description now turns to variants of this embodiment of the invention.

Figure 4:
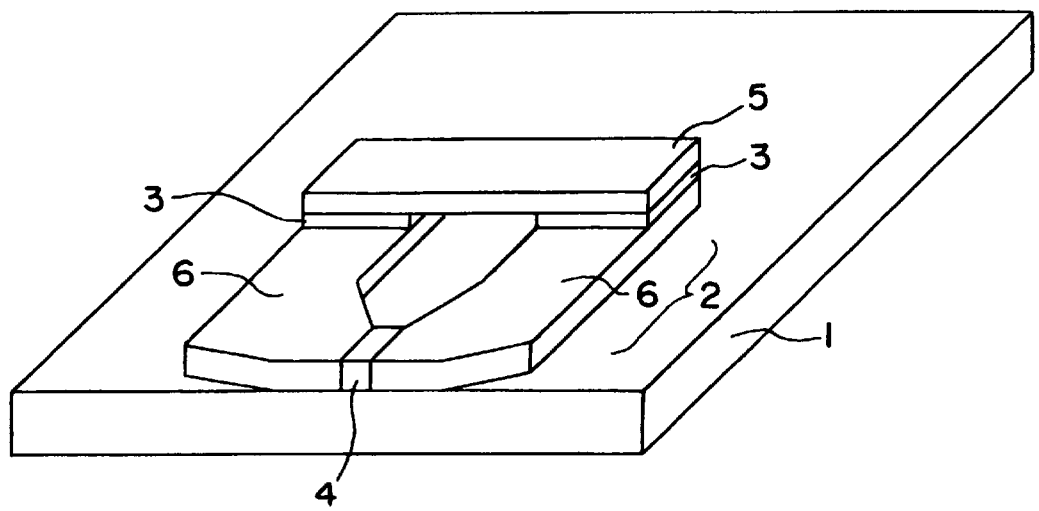
FIG. 4 is a schematic view of a second magnetic head in accordance with the first embodiment.

A schematic view of a second magnetic head in accordance with this embodiment is shown in FIG. 4. This figure is similar to FIG. 1 in that it is a perspective view as seen from the facing surface with respect to a magnetic recording medium (not shown in the figure). In this figure, portions that are the same as those described previously with reference to FIG. 1 are denoted by the same reference numbers and further description thereof is omitted.

In this example, the magnetic yokes 2 are formed from a soft magnetic material 6, where various types of material having a high level of permeability can be used as the "soft magnetic material," such as NiFe or CoZrNb.

Granular magnetic films 3 are interposed between each of the magnetic yokes 2 composed of this soft magnetic material 6 and the MR element 5. These granular magnetic films 3 are thin films constructed of the "granular magnetic film" that was described above with reference to FIGS. 1 to 3. The magnetic yokes 2 and the MR element 5 are magnetically coupled by the granular magnetic films 3. In other words, a signal magnetic field that flows from the recording medium (not shown in the figure),through the magnetic gap 4, and into the magnetic yokes 2 is guided to the MR element 5 by the granular magnetic films 3.

In a prior-art yoke-type magnetic head, the space between the magnetic yoke and the magneto-resistance effect element is electrically insulated by a simple insulating film of a material such as alumina. This prevents problems such as a deterioration of sensitivity because of flow into the magnetic yokes and also the generation of noise due to the flow of current towards the recording medium, which in the worst case could destroy the recording medium. However, a non-magnetic insulating film, such as one of alumina, obstructs the induction of magnetic flux and, as a result, dramatically reduces the amount of magnetic flux flowing into the magneto-resistance effect element, which causes a deterioration insensitivity.

In contrast thereto, this example makes it possible to guide the magnetic flux efficiently into the magneto-resistance effect element 5 while retaining the electrical insulation characteristics, by using the granular magnetic films 3. In other words, the presence of the granular magnetic films 3 in this example ensures that there is substantially no shunting into the magnetic yokes 2 of the flow of the sense current from the leads (not shown in the figure), and also makes it possible to guide the signal flux from the recording medium efficiently into the MR element 5.

The description now concerns a third example of this embodiment of the invention.

Figure 5:
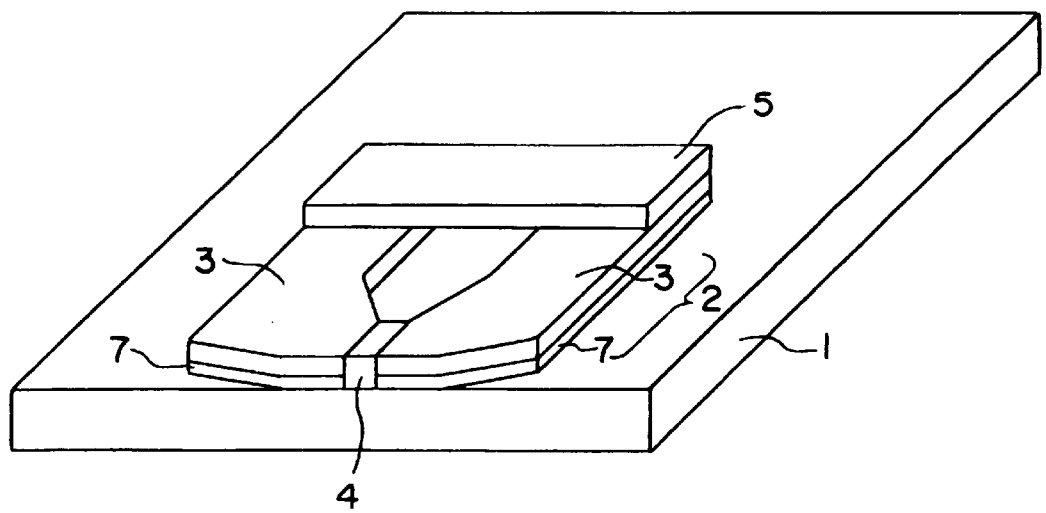
FIG. 5 is a schematic view of a third magnetic head in accordance with the first embodiment.

A schematic view of a third magnetic head in accordance with this embodiment is shown in FIG. 5. In this figure is again a perspective view as seen from a facing surface with respect to a magnetic recording medium(not shown in the figure). In this figure too, portions that are the same as those described previously with reference to FIGS. 1 to 4 are denoted by the same reference numbers and further description thereof is omitted.

In this specific example, each of the pair of magnetic yokes 2 is configured of a multi-layer structure comprising the granular magnetic film 3 and an antiferromagnetic film 7. The antiferromagnetic film 7 is a thin film formed of an antiferromagnetic material.

Use of such a multi-layer structure enables an exchange coupling between the granular magnetic film 3 and the antiferromagnetic film 7. The effects of using the granular magnetic film 3 have been described previously with reference to FIG. 1, but the addition of this exchange coupling with the antiferromagnetic film 7 makes it possible to reduce noise even further.

In other words, if the antiferromagnetic film 7 is made to exhibit magnetic anisotropy, this magnetic anisotropy is also applied to the granular magnetic film 3 through the exchange coupling. In such a case, the exchange coupling with the antiferromagnetic film 7 ensures that the magnetization of the granular magnetic film 3 is focused within each magnetic domain, thus making it possible to suppress movement of the magnetic domain walls. This effect makes it possible to suppress Barkhausen noise. It is therefore possible to prevent the generation of Barkhausen noise even when magnetic isotropy is induced by thermal processing within a rotational magnetic field or film formation within a magnetic field, as will be described in detail later.

Various different materials could be used as the antiferromagnetic film 7 that is utilized in this case. Examples of suitable materials include IrMn, FeMn, and PtMn. The film thickness thereof is anywhere within a range that enables the exchange coupling with the granular magnetic film 3 and also enables an anisotropic magnetic field, such as 5 nm to 500 nm.

The description now turns to a fourth specific example of this embodiment of the invention.

Figure 6:
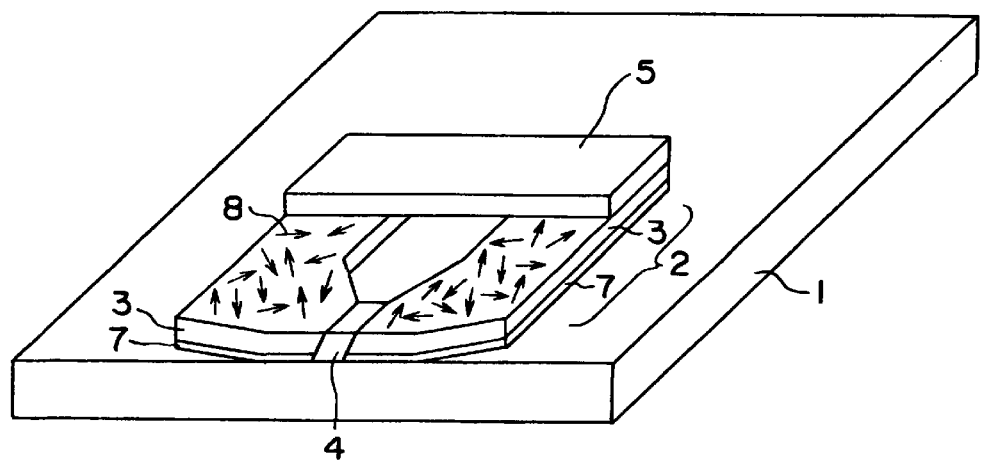
FIG. 6 is a schematic view of a fourth magnetic head in accordance with the first embodiment.

A schematic view of a fourth magnetic head in accordance with this embodiment is shown in FIG. 6. This figure is again a perspective view as seen from a facing surface with respect to a magnetic recording medium (not shown in the figure). In this figure too, portions that are the same as those described previously with reference to FIGS. 1 to 4 are denoted by the same reference numbers and further description thereof is omitted.

The pair of magnetic yokes 2 of this specific example also has a multi-layer structure comprising the antiferromagnetic film 7 and the granular magnetic film 3. In addition, the magnetic domains of the granular magnetic film 3 of this example are made to be isotropic on the macroscopic scale, as indicated by magnetization 8 in the figure. One method that could be cited for forming such a magnetic domain structure is thermal processing within a magnetic field.

Figure 7:
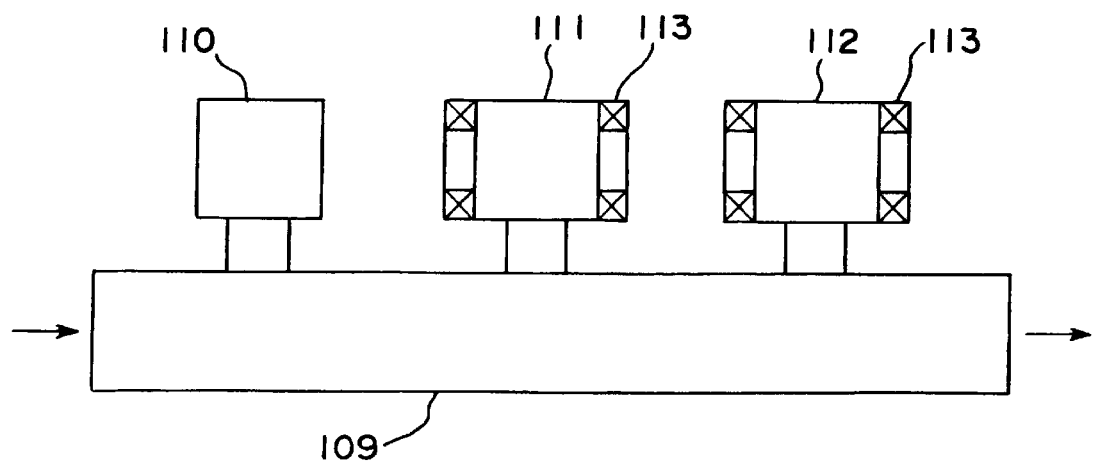
FIG. 7 is a schematic view of a film formation device for forming the magnetic domain structure of the magnetic yokes 2.

A schematic view of a film formation device used to form the magnetic domain structure of the magnetic yokes 2 in accordance with this example is shown in FIG. 7. More specifically, the film formation device in this figure comprises a transfer chamber 109 and film-formation chambers 110, 111, and 112. The film formation chambers are for forming an under-layer film, an antiferromagnetic film, and a granular magnetic film.

Each of the transfer chamber 109 and the film-formation chambers 110, 111, and 112 is connected to a corresponding vacuum pump, enabling films to be formed without exposure to the atmosphere. The sequence of this film formation is as described below.

First of all, the substrate 1 is introduced into the film-formation chamber 110 and an underlayer film is formed thereon. This underlayer film ensures that a stable structure is obtained for the antiferromagnetic film 7. A material such as Ta, Cu, or NiFe could be used as the material of the underlayer film.

The substrate then moves into the film-formation chamber 111 and the antiferromagnetic film 7 is formed. In this case, the interior of the film-formation chamber 111 is provided with a heating device (not shown in the figure) for heating the substrate 1 to at least the blocking temperature of the antiferromagnetic film 7 and a coil 113 for applying a magnetic field to the substrate 1. These components are used to heat the substrate 1 to approximately 300° C. and apply a AC magnetic field on the order of a maximum of 200 Oe at a frequency of 50 Hz, during the formation of an IrMn film that is an antiferromagnetic film.

The substrate 1 then moves to the film-formation chamber 112 and the granular magnetic film 3 is formed thereon in a similar manner while the substrate 1 is heated to approximately 300° C. and a AC magnetic field on the order of a maximum of 200 Oe is applied to the substrate 1 at a frequency of 50 Hz.

The above described method makes it possible to form the multi-layer film of the antiferromagnetic film 7 and the granular magnetic film 3 which has the magnetic domain structure shown in FIG. 6.

Since the multi-layer film of the antiferromagnetic film 7 and the granular magnetic film 3 is used for the magnetic yokes 2 in the yoke-type magnetic head of this specific example, it is possible to substantially eliminate the shunt into the magnetic yokes 2 of the sense current supplied to the leads and also further increase the soft magnetic properties, thus guiding the signal flux from the recording medium efficiently into the MR element in a similar manner to that of the specific example that was described previously with reference to FIG. 5. Furthermore, the magnetic domains in accordance with this example are miniaturized and the magnetization within these magnetic domains is focused, making it possible to suppress Barkhausen noise even more efficiently, with substantially no movement of the magnetic domain walls.

The description now turns to a fifth specific example of this embodiment of the invention.

Figure 8:
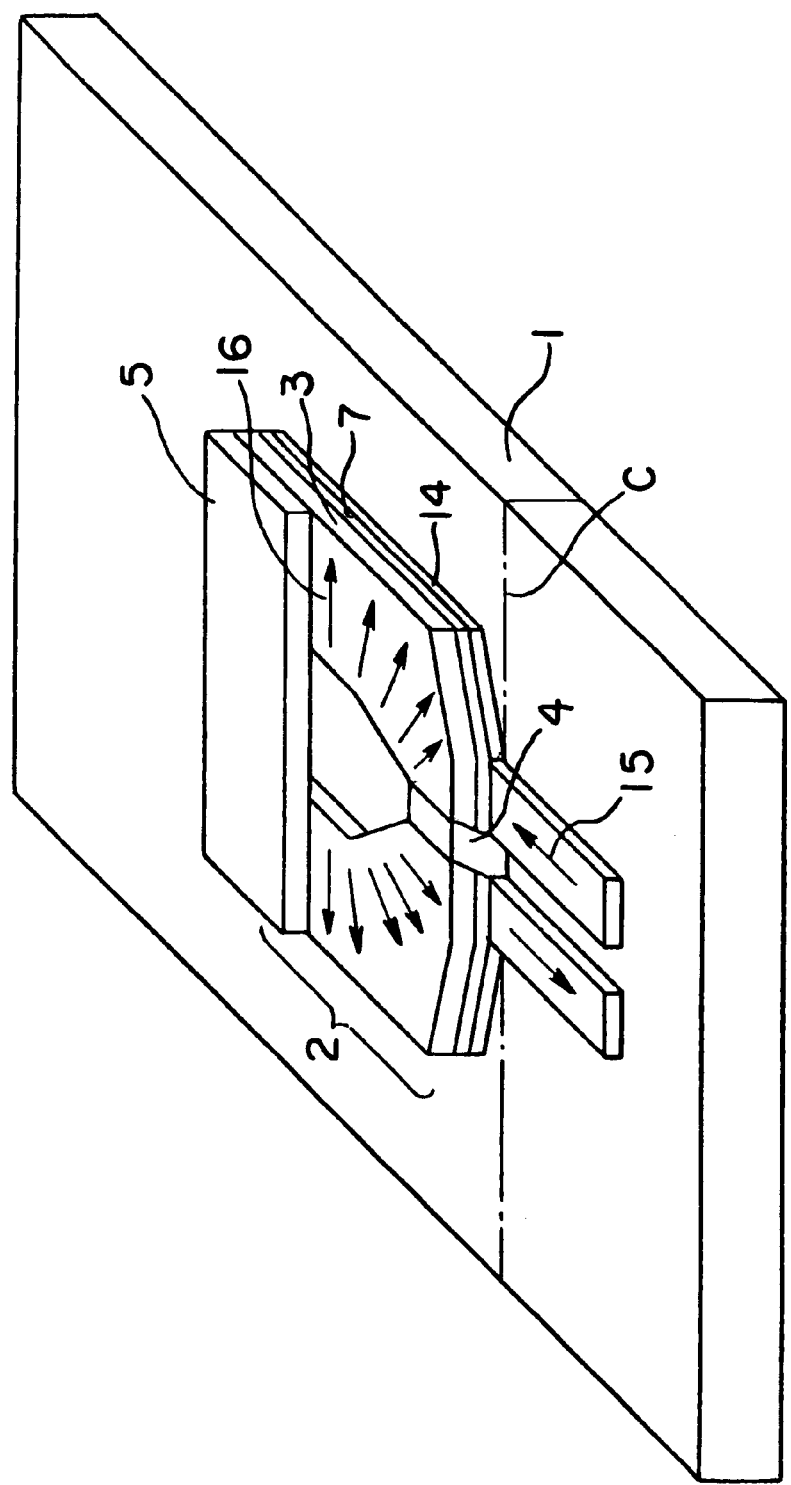
FIG. 8 is a schematic view of a state partway through the fabrication of a fifth magnetic head in accordance with the first embodiment.

A schematic view of the state of a fifth magnetic head in accordance with this embodiment, partway through the fabrication thereof, is shown in FIG. 8. In this figure too, portions that are the same as those described previously with reference to FIGS. 1 to 7 are denoted by the same reference numbers and further description thereof is omitted.

In this example, a pair of electrically conductive layers 14 are formed on the substrate 1, and a pair of magnetic yokes 2 having a multi-layer structure of the antiferromagnetic film 7 and the granular magnetic film 3 are provided thereupon. In addition, a radial magnetic anisotropy 16 is induced into the granular magnetic film 3, as shown in the figure.

This radial magnetic anisotropy can be induced by heating while a current is flowing through the electrically conductive layer 14. It is possible, for example, to induce this radial magnetic anisotropy 16 in the granular magnetic film 3 by subjecting it to thermal processing at a temperature of approximately 300° C. while a current 15 is flowing through the electrically conductive layer 14, before the slider is machined.

After the magnetic anisotropy has been induced in this manner, the facing surface with respect to a recording medium (not shown in the figure) can be formed by cutting along a cutting line C.

In this case, when the radial magnetic anisotropy shown in this figure is induced by a method such as electrically conductive thermal processing, anisotropy must be induced to a certain extent in the exchange coupling within the granular magnetic film 3, if the antiferromagnetic film 7 is not superimposed thereon, so that a comparatively high temperature and a strong current is necessary.

In contrast thereto, this specific example of the invention makes it possible to utilize an exchange coupling with the antiferromagnetic film 7 by superimposing the antiferromagnetic film 7, thus making it possible to induce the radial magnetic anisotropy 16 at a lower temperature and with a weaker current.

Since the multi-layer film of the antiferromagnetic film 7 and the granular magnetic film 3 is used as the magnetic yokes 2 in this example, it is possible to guide the signal flux from the recording medium efficiently into the MR element 5, with substantially no shunt into the magnetic yokes 2 of the sense current supplied from the leads.

In addition, the radial magnetic anisotropy 16 ensures that the direction in which the magnetic flux flows is substantially perpendicular to the direction of magnetization, at all locations on the magnetic yokes 2, causing excitation in the direction of so-called the hard axis of magnetization. As a result, movement of the magnetic domain walls is suppressed, and the flow of magnetic flux is governed only by rotation of the magnetization, which makes it possible to suppress the generation of Barkhausen noise in an extremely efficiently manner. In other words, the linear response characteristics are increased and the frequency response characteristics are also improved.

Second Embodiment

The description now turns to a second embodiment of the present invention. This embodiment makes it possible to achieve both a high level of sensitivity and a low level of noise, by ensuring that the magnetization state of the magnetic yoke comprises "maze domains," or a state that is close thereto.

Figure 9:
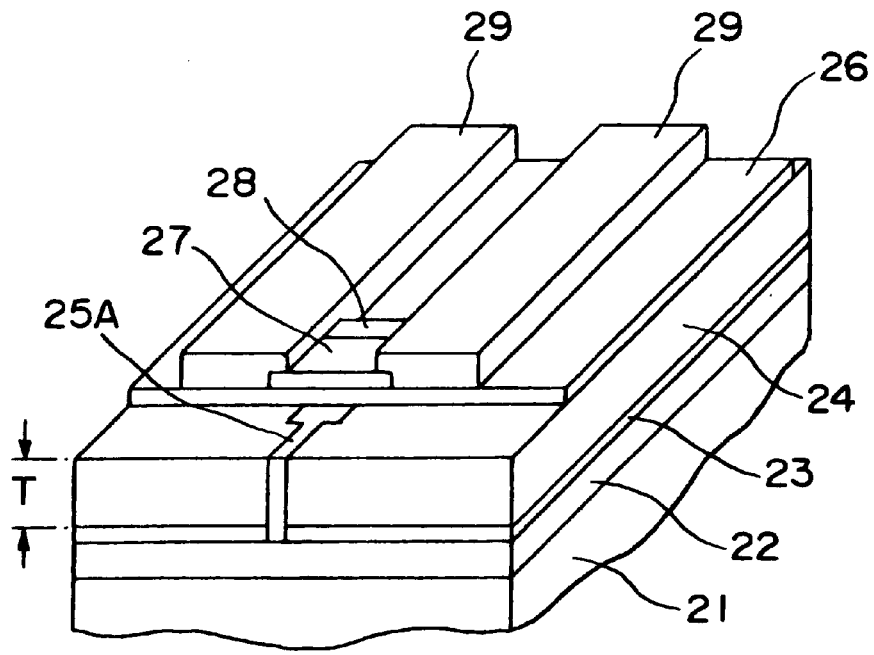
FIG. 9 is a schematic view exemplifying the structure of a magnetic head in accordance with a second embodiment of the present invention.

A schematic view exemplifying the structure of a magnetic head in accordance with this embodiment is shown in FIG. 9. This figure is again a perspective view as seen from a facing surface with respect to a magnetic recording medium (not shown in the figure). A Ta/Cu/Ta multi-layer film 22 is formed on top of a substrate 21 of $Al_2O_3$—TiC/$Al_2O_3$ (a multi-layer structure of an aluminum oxide layer superimposed on an ALTIC substrate), and a pair of magnetic yokes 24 is formed thereupon with an antiferromagnetic film 23 interposed therebetween. A material such as iron nitride (Fe—N) could be used as the material of the magnetic yoke. The film thickness T thereof determines the width of the reproduction track, and could be on the order of 0.3 μm, by way of example.

The spacing of a reproduction gap 25A provided at the tips of the magnetic yokes 24 is 50 nm, by way of example, and the reproduction gap 25A is filled with copper. An insulating film 26 is provided on top of the magnetic yokes 24. The insulating film 26 is formed of a material such as alumina and the thickness thereof could be on the order of 30 nm, by way of example. A magnetic field sensor 27 is provided on top of the insulating film 26 at a position that is on the order of 0.5 μm from the reproduction gap 25A, on a back gap. Various different elements could be used as the magnetic field sensor 27, such as a GMR element or an AMR element. In this figure, a GMR element is used by way of example, and a bias film 28 that is intended to regulate the magnetic domain is formed on an end surface thereof. A pair of leads 29 is connected to the magnetic field sensor 27 in order to supply a sense current thereto.

In the configuration described above, magnetic domains are induced in the magnetic yokes 24 of this embodiment in a direction close to perpendicular. In other words, the magnetic yokes 24 are formed by using a material that has perpendicular magnetic anisotropy, such as iron nitride, and the magnetization of the magnetic yokes 24 is orientated in a direction that is perpendicular to the film surface thereof. Alternatively, "maze domains" are generated at an angle to the perpendicular direction.

Magnetization that is orientated in a direction that is substantially perpendicular to the magnetic yoke surfaces is basically not magnetic anisotropy within the surface but isotropy. In other words, isotropic permeability is obtained thereby. It is known that "maze domains" are formed as the magnetization approaches the perpendicular orientation even further.

Figure 10:
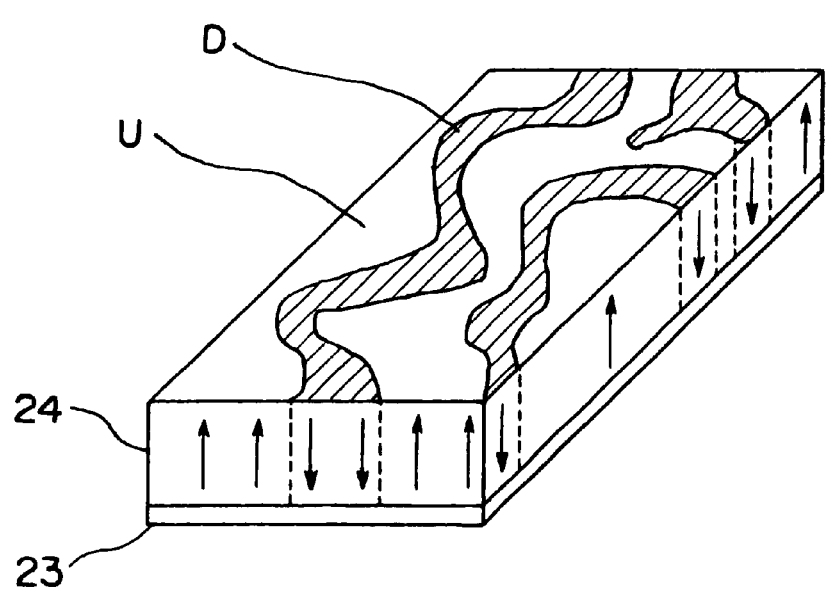
FIG. 10 is a partial enlarged view illustrating "maze domains" within the magnetic yokes 24, in a schematic manner.

A partial enlarged view of the maze domains is shown schematically in FIG. 10.

Figure 11:
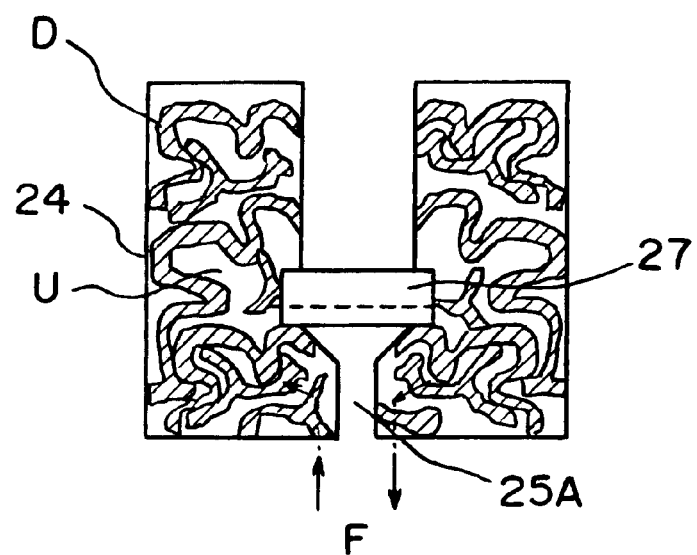
FIG. 11 is a schematic view of the flow of magnetic flux within a magnetic head in accordance with a second embodiment of this invention.

A schematic view of the flow of magnetic flux through the magnetic head of this embodiment is shown in FIG. 11. The magnetic flux F from a recording medium (not shown) is schematically shown by arrows in the figure. As shown in these figures, the term "maze domains" represents a state in which magnetic domains U having an upwardly orientated magnetization, with respect to the magnetic yoke surfaces, and magnetic domains D having a downwardly orientated magnetization are aligned in ribbon form in close proximity. The width of each of the magnetic domains U and D in these maze domains is on the order of 0.2 to 0.3 μm, so the magnetic paths therebetween are extremely small. In other words, changes in the magnetic domains can barely be perceived as Barkhausen noise. In addition, no closure magnetic domain is formed in the neighborhood of the gap 25A. The permeability of the magnetic yokes 24 is also isotropic, and is on the order of approximately 500, byway of example.

In this embodiment of the invention, the magnetic domain state of the maze domains is stabilized and variations with time can be prevented by magnetic coupling between the soft magnetic film that forms the magnetic yokes 24 and the antiferromagnetic film 23.

As described previously, this embodiment of the invention makes it possible to suppress Barkhausen noise by achieving isotropic permeability within the magnetic yoke surfaces and forming microscopic magnetic domains, and also makes it possible to maintain a high level of reliability with respect to Barkhausen noise by suppressing any variations with time of the magnetic domains. As a result, it is possible to provide a planar yoke-type magnetic head that is highly efficient and has low levels of noise.

The description now turns to a process of fabricating this first specific example of the magnetic head in accordance with this embodiment of the invention.

Representative views of the process of fabricating the magnetic head of this embodiment are shown in FIGS. 12 to 15.

Figure 12:
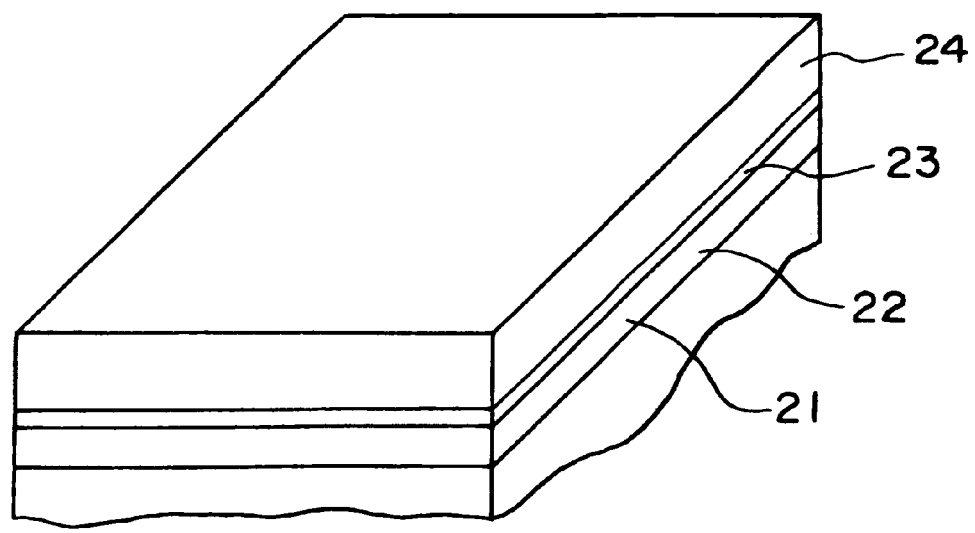
FIG. 12 is a representative view during the process of fabricating the magnetic head of this second embodiment.

First of all, a multi-layer structure is formed onto the substrate 21, up to the film that will form the magnetic yokes 24, as shown in FIG. 12. An ALTIC substrate with an alumina film coated thereon and then flattened could be used as the substrate 21. A multi-layer film consisting of 10 nm of Ta, 100 nm of Cu, and 10 nm of Ta is formed on top of the substrate 21. An IrMn film with a thickness of 20 nm is then formed thereon as the antiferromagnetic film 23, and then a iron nitride (Fe—N) film is formed thereon for the magnetic yokes 24. This superposition of films could be done continuously by using sputtering.

In this case, the substrate is heated to 300° C. and a rotational magnetic field of 100 Oe is applied thereto during the formation of the IrMn film 23 and the Fe—N film 24. After these films are formed, the substrate is further heated to 500° C. and a rotational magnetic field of 5 kOe is applied thereto, to subject it to thermal processing in a rotational magnetic field for one hour.

This makes it possible to induce magnetic domains that are substantially perpendicular to the magnetic yokes 24, or maze domains.

The magnetic yokes 24 are then patterned.

More specifically, first of all, the Fe—N film that configures the magnetic yokes 24 is subjected to ion-milling to form the outer shapes of the magnetic yokes 24.

A focused ion beam (FIB) is then used to form a banded aperture in such a manner that the reproduction gap has a width of 0.05 μm and a back gap portion thereof has a width of 0.5 μm.

Figure 13:
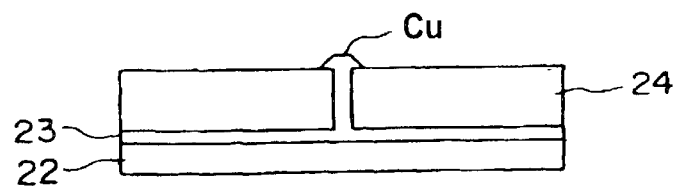
FIG. 13 is another representative view during the process of fabricating the magnetic head of this second embodiment.

Copper film is then embedded into the reproduction gap 25A and the back gap 25B by copper-plating, as shown in FIG. 13.

Figure 14:
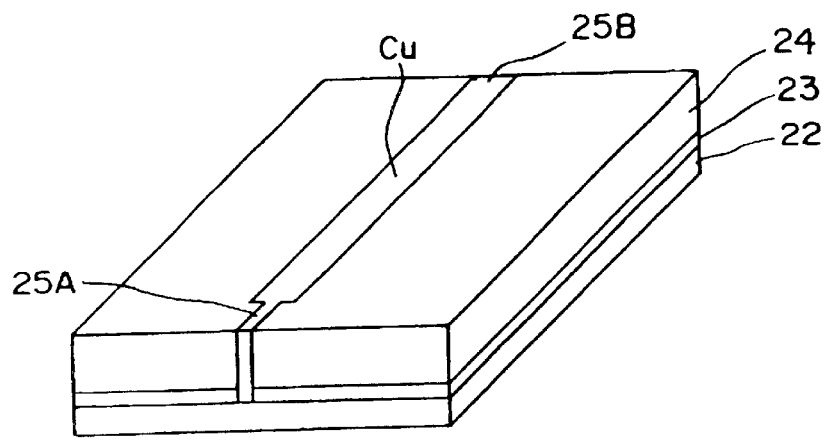
FIG. 14 is a further representative view during the process of fabricating the magnetic head of this second embodiment.

Chemical mechanical polishing (CMP) is then used to remove and copper protruding from the surface of the magnetic yokes 24 and also remove the surface of the magnetic yokes 24 slightly, to flatten it, as shown in FIG. 14.

Figure 15:
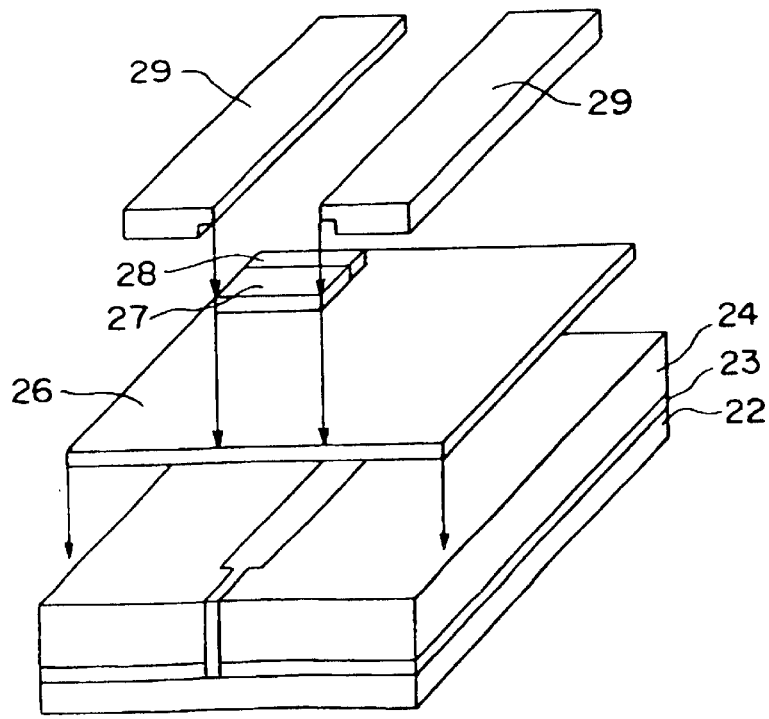
FIG. 15 is a yet further representative view during the process of fabricating the magnetic head of this second embodiment.

The reproduction element 26–29 is formed thereupon, as shown in FIG. 15. More specifically, an alumina film of approximately 0.03 $\mu$m is first overlaid thereon by ion beam deposition (IBD), as the insulating film 26. A GMR element 27 is then formed as a film and patterning is performed in the depthwise direction in such a manner to abutted junction with the GMR element 27. The bias film 28 is formed and then lifted off in such a manner to abutted junction with the GMR element 27, and then the medium-surface side of the GMR element 27 is regulated. It could be shaped so that the height thereof as seen from the side facing the recording medium is 0.5 $\mu$m, by way of example.

The copper leads 29 for supplying the sense current are formed to overlap the GMR element 27 by approximately 0.2 $\mu$m. This causes a lowering in the contact resistance between the GMR element 27 and the leads 29 that supply the sense current, thus enabling the formation of a structure that is strong with respect to electrostatic discharge (ESD).

Note that the sheet resistance of the leads 29 is preferably low. It is therefore preferable to use a material that has a low level of electrical conductivity, such as gold (Au) or aluminum (Al). This lowers the crowding resistance in the vicinity of the GMR element 27, making it possible to reduce the contact resistance and thus form a magnetic head element that has a high destruction voltage with respect to ESD.

After the reproduction element portion has been completed, a protective film is formed and depthwise polishing is performed to determine the depth of the reproduction gap.

Isolated read pulse at a linear recording density of 10 kFCI were measured with the thus created reproduction head and, as a result, it was verified that an output of at least 500 $\mu$V was achieved, and also the Barkhausen noise was substantially suppressed.

It should be noted that the material used for the magnetic yokes 24 of this embodiment of the invention is not limited to iron nitride (Fe—N). The description now turns to examples in which other materials were used.

The first specific example concerns a case in which a NiFe film was used for the magnetic yokes 24.

$Ni_{80}Fe_{20}$ generally has an FCC structure and exhibits [111] orientation. In this case, magnetocrystalline anisotropy, which is the magnetic anisotropy that is inherent to crystals, does not exhibit a perpendicular orientation. In contrast thereto, crystal grains in accordance with the present invention are formed as microcrystals and are also extended in the film thickness direction to form a columnar structure as shown in FIG. 15. This causes the formation of shape magnetic anisotropy, which enables the formation of a magnetization orientation in the perpendicular direction.

An example of this formation is illustrated below with reference to FIG. 9. An ALTIC substrate with an alumina film coated thereon and then flattened is used as the substrate 1.

A 10-nm film of Ta, a 100-nm film of Cu, a 10-nm film of Ta, a 20-nm film of IrMn, and a 300-nm film of NiFe, in sequence from the lower the, are then formed by continuous sputtering. These correspond to the multi-layer film 22, the antiferromagnetic film 23, and the magnetic yokes 24 of FIG. 1. In this case, the pressure is on the order of 10 mTorr during the formation of the 20-nm IrMn film, enabling the formation of tiny crystal grains on the order of 10 nm.

The NiFe is formed at 0.2 mTorr. During this time, a rotational magnetic field of 100 Oe is applied. In other words, the films are formed under conditions such that the IrMn film 23 that forms an underlayer for the NiFe film 24 is turned into microcrystals by the high sputtering pressure during the formation thereof, and the NiFe film 24 that is grown thereupon at a low sputtering pressure tries to retain the crystal size of the underlayer (the IrMn film 23) as far as possible. This method makes it possible to obtain films with a columnar structure including crystal grains G1 of NiFe, as shown by way of example in FIG. 16.

After the film formation, this sample is heated to 300° C. and a rotational magnetic field of 5 kOe is applied to subject the structure to thermal processing for approximately one hour. From there on, the magnetic head as previously described with reference to FIGS. 13 to 15 can be formed.

When the magnetic domains of the magnetic yokes 24 in the thus created magnetic head were observed by a measurement device that makes use of the Kerr effect, maze domains were observed. In other words, it was verified that shaped magnetic anisotropy could be used to form maze domains, by artificially forming a microscopic orientated structure.

If a non-magnetic material is precipitated into the gaps between these columnar oriented microcrystal grains, so that the crystal grains are isolated from each other magnetically, the perpendicular magnetization thereof is further encouraged. The description below concerns specific examples in which a non-magnetic component is precipitated along crystal grain boundaries.

An ALTIC substrate with an alumina film coated thereon and then flattened can be used as the substrate 1, in a similar manner to the previously described specific example. A 10-nm film of Ta, a 100-nm film of Cu, a 10-nm film of Ta, a 20-nm film of IrMn, and a 300-nm film of CoFeTaCu alloy, in sequence from the lower the, are then formed by continuous sputtering. These correspond to the multi-layer film 22, the antiferromagnetic film 23, and the magnetic yokes 24 of FIG. 1. In this case, the pressure is on the order of 10 mTorr during the formation of the 20-nm IrMn film, enabling the formation of tiny crystal grains on the order of 10 nm.

The film of CoFeTaCu alloy is formed at 0.2 mTorr. During this time, the substrate temperature is raised to approximately 300° C. and a rotational magnetic field of 100 Oe is applied thereto. In other words, the films are formed under conditions such that the IrMn film 23 that forms an underlayer for the NiFe film 24 is turned into microcrystals by the high sputtering pressure during the formation thereof, and the CoFeTaCu film 24 that is grown thereupon at a low sputtering pressure tries to retain the crystal size of the underlayer (the IrMn film 23) as far as possible. At the same time, the substrate of this specific example is heated during the film formation, to cause the copper in the CoFeTaCu alloy to precipitate into the crystal grain boundaries.

After the film formation, this sample is heated to 400° C. and a rotational magnetic field of 5 kOe is applied to subject the structure to thermal processing for approximately one hour. The thermal processing during this time further encourages the precipitation of the copper.

From there on, the magnetic head as previously described with reference to FIGS. 13 to 15 can be formed.

Figure 17:
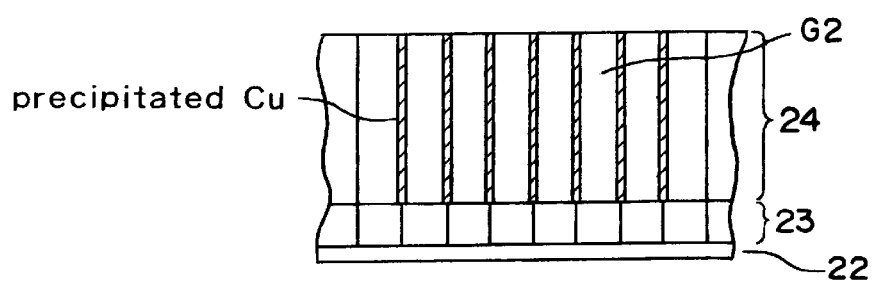
FIG. 17 is a schematic view of a state in which copper precipitates at grain boundaries within a CoFeTaCu alloy that configures the magnetic yokes 24 of the magnetic head.

A schematic view of a state in which the copper from the CoFeTaCu alloy, which forms the magnetic yokes 24 of the magnetic head of the above configuration, has precipitated into the grain boundaries is shown in FIG. 17.

CoFeTa crystal grains G2 have a hcp (hexagonal close-packed) structure and have easy axis of magnetization in the [0001] direction, and [0001] growth is generally easy. Since copper (Cu) does not form a solid solution with cobalt (Co), heating promotes the precipitation of copper into the grain boundaries. As a result, the perpendicularly orientated CoFeTa crystals are isolated from the copper that has precipitated into the grain boundaries. The perpendicular orientation of the magnetization of the crystal grains can be further promoted by this isolation of mutual magnetic interaction between neighboring crystal grains.

Figure 16:
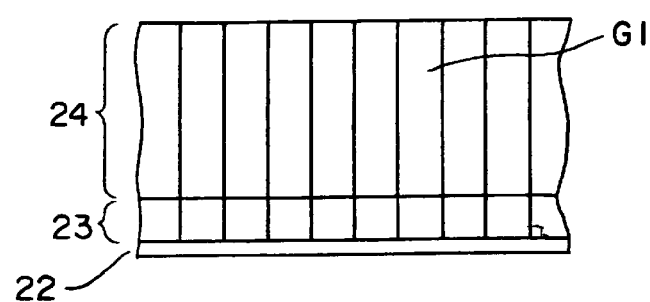
FIG. 16 is a schematic view of a state in which crystal grains are micro crystals that are also extended in the film thickness direction.

As shown by way of example in FIG. 16, it is possible to generate a magnetization orientation in the perpendicular direction in a simple manner, by utilizing the shape magnetic anisotropy caused by the shape of the crystal grains. It should be noted, however, that there are magnetic exchange couplings between neighboring crystal grains, so there is a tendency for the magnetization to orientate easily within the surface. In contrast thereto, this specific example makes it possible to encourage a more perpendicular orientation of the magnetization, by causing a non-magnetic material to precipitate into gaps between these columnar crystal grains and thus isolate individual crystal grains magnetically.

Third Embodiment

The description now turns to a third embodiment of the present invention. This embodiment makes it possible to perform a perpendicular magnetic recording/reproduction with a high level of sensitivity and a low level of noise, by using a magnetic head having a major pole and a return yoke, which includes the "granular magnetic film" as described with reference to the first embodiment of the invention or the "maze domains" as described with reference to the second embodiment of the invention.

Figure 18A:
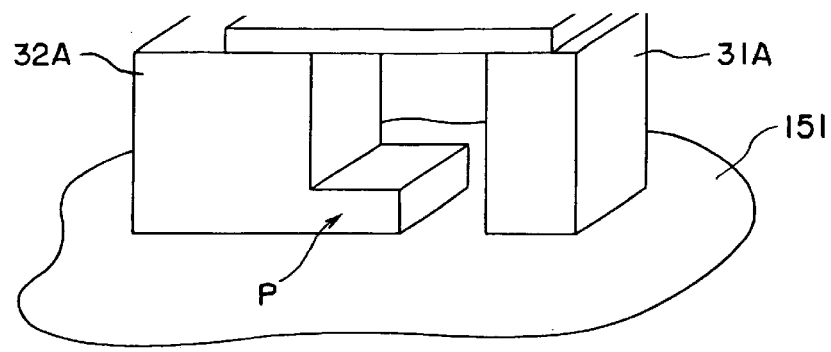
FIG. 18A is a schematic perspective view exemplifying the structure of a first magnetic head in accordance with third embodiment of the invention.

A schematic perspective view exemplifying the structure of a first magnetic head in accordance with this embodiment is shown in FIG. 18A. The magnetic head shown in the figure has a major pole (first yoke member) 31A and a return yoke (second yoke member) 32A which are disposed to face the recording medium 151, and a magneto-resistance effect (MR) element 33 disposed to bridge the major pole and the return yoke.

The major pole 31A and the return yoke 32A is made of the granular magnetic film as described with reference to the first embodiment of the invention. Thus, it becomes possible to suppress the Barkhausen noise and the perpendicular magnetic recording/reproduction with a high level of sensitivity and a low level of noise is realized.

A pair of leads (not shown) made of a conductive material such as copper are connected to the both ends of the MR element 33 in order to provide a sense current thereto The fabrication procedure of the magnetic head shown in the figure is briefly described below.

First, an underlayer (not shown) made of a metal such as copper is formed on a thermally oxidized silicon substrate (not shown). Then, a granular magnetic film is formed by sputtering or the like as described with reference to the first embodiment of the invention in order to form the major pole 31A and the return yoke 32A.

More specifically, the granular film of a thickness of the top L-shaped thin portion (indicated by the reference symbol P in FIG. 18A) is formed first. Then, a photoresist is applied thereon, which is then patterned by the exposing and developing process in order to open the gap between the major pole 31A and the return yoke 32A.

Then, by using the patterned photoresist as the etching mask, the granular film is selectively etched by ion-milling or RIE (reactive ion etching). The gap between the tips of the major pole 31A and the return yoke 32A can be formed by a focused ion beam (FIB).

Then, the gap is plugged by copper (not shown). After removing the photoresist, another granular magnetic film is stacked and a photoresist layer is formed thereon and patterned into a mask by the exposing and developing it. After that, the second granular film is selectively etched by ion-milling or RIE. Then, a insulating layer, such as alumina film, having substantially the same thickness as the granular film is formed and the part of the insulating layer which is on the granular magnetic film is selectively removed (lift-off) by removing the photoresist film. Then, a alumina layer is formed and the surface is planarlized by a CMP (chemical mechanical polishing).

After that, a multi-layered structure is formed and pattered by a conventional photolithographic process to form the MR element 33. Then, a conductive film such as a copper layer is formed and a pair of lead (not shown) are formed by patterning the film by a photolithographic process.

After that, an alumina layer is formed as a protective layer and a through-holes are opened in order to take out the lead electrodes. The electrodes are formed by a plating technique. And, another alumina layer is overcoated and the electrode portions are opened and gold pads are formed thereon. Finally, the silicon substrate and the underlayer are removed by a wet etching in order to expose the medium facing surface of the magnetic head.

According to the above-explained procedure, any film deposition process and a pattering process on the the surface of the substrate become unnecessary and the whole fabrication process becomes much easier and the manufacturing cost of a magnetic head decreases.

Figure 18B:
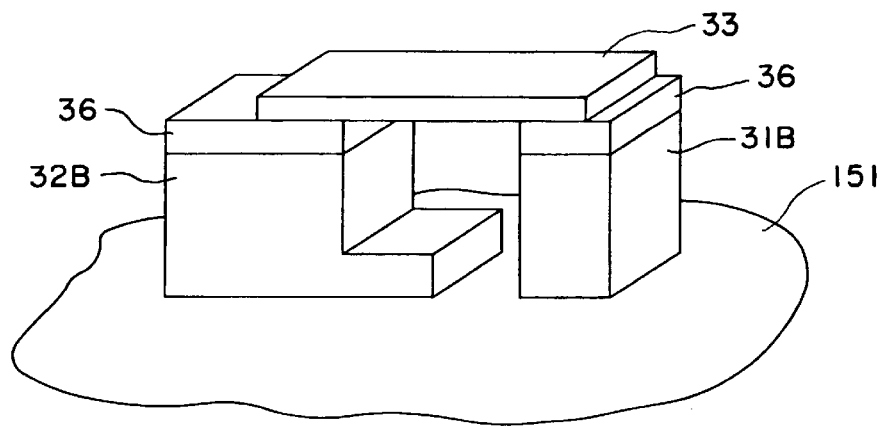
FIG. 18B is a schematic perspective view exemplifying the structure of a second magnetic head in accordance with third embodiment of the invention.

FIG. 18B is a schematic perspective view exemplifying the structure of a second magnetic head in accordance with this embodiment. The magnetic head shown in the figure has a major pole (first yoke member) 31B and a return yoke (second yoke member) 32B which are disposed to face the recording medium 151, a MR element 33 disposed to bridge the major pole and the return yoke and granular magnetic films 36 interposed therebetween.

The major pole 31B and the return yoke 32B are made of a soft magnetic material such as NiFe and CoZrNb. By interposing the granular magnetic films 36 between the MR element 33 and the major pole 31B or the return yoke 32B, a shunt of a sense current provided to the MR element 33 to the major pole 31B and the return yoke 32B is suppressed and the magnetic signal flux from the medium 151 can be lead to the MR element in a high efficiency, as described with reference to the first embodiment of the invention.

Figure 18C:
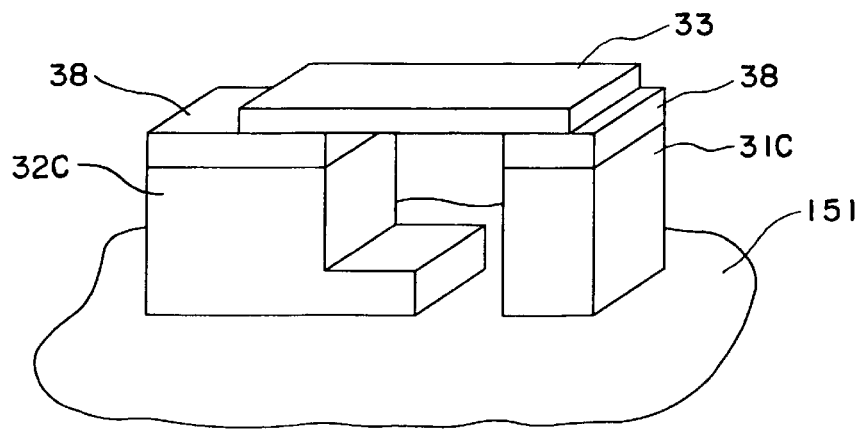
FIG. 18C is a schematic perspective view exemplifying the structure of a third magnetic head in accordance with third embodiment of the invention.

FIG. 18C is a schematic perspective view exemplifying the structure of a third magnetic head in accordance with this embodiment. The magnetic head shown in the figure has a major pole (first yoke member) 31C and a return yoke (second yoke member) 32C which are disposed to face the recording medium 151, a MR element 33 disposed to bridge the major pole and the return yoke and insulating films 38 interposed therebetween.

The major pole 31C and the return yoke 32C is made of a magnetic material which forms the maze domains as described in the second embodiment. Accordingly, it becomes possible to suppress Barkhausen noise by achieving isotropic permeability within the major pole and the return yoke surfaces and forming microscopic magnetic domains, and also makes it possible to maintain a high level of reliability with respect to Barkhausen noise by suppressing any variations with time of the magnetic domains. As a result, it is possible to provide a magnetic head for a perpendicular magnetic recording/reproducing that is highly efficient and has low levels of noise.

Fourth Embodiment

The description now turns to a magnetic recording/reproduction device that is a fourth embodiment of the present invention.

The magneto-resistance effect type of head of the previous embodiments can be assembled into a combination recording/reproduction magnetic head which can be installed in a magnetic recording/reproduction device.

Figure 19:
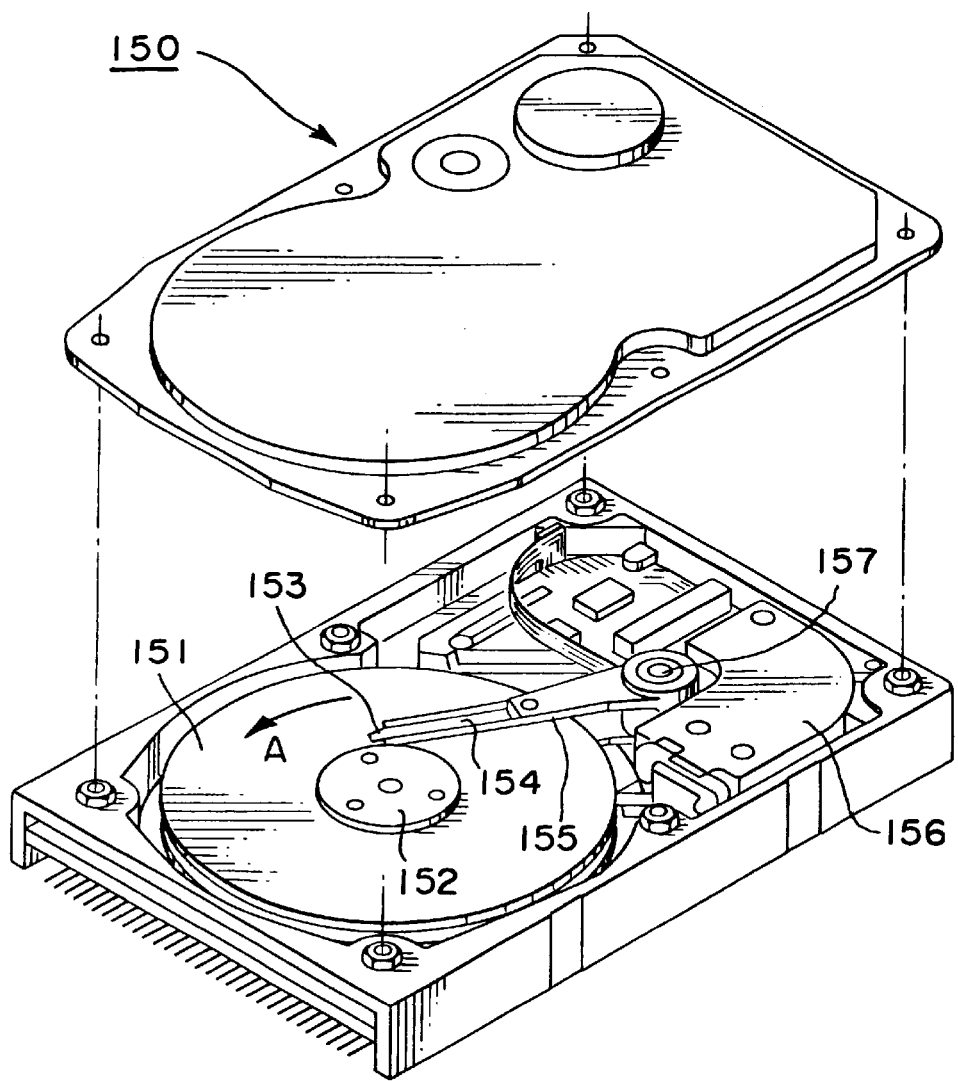
FIG. 19 is a perspective view of essential components that exemplify the configuration of a magnetic recording/reproduction device.

A perspective view of essential components that exemplify the structure of such a magnetic recording/reproduction device is shown in FIG. 19. A magnetic recording/reproduction device 150 in accordance with this invention is a type of device that uses a rotary actuator. As shown in this figure, a magnetic disk 151 is mounted on a spindle 152 and is rotated by a motor (not shown in the figure) in response to control signals from a drive device control portion (also not shown in the figure). A head slider 153 for recording or reproducing information that is stored in the magnetic disk 151 is attached to a tip of a thin film-shaped suspension member 154. In this case, a magnetic head in accordance with any of the previously described embodiments is mounted in the vicinity of the tip of the head slider 153.

When the magnetic disk 151 rotates, a medium-facing surface (for example ABS in case of the floating sliding) of the head slider 153 is maintained at a predetermined amount of floating from the surface of the magnetic disk 151.

The suspension member 154 is connected to one end of an actuator arm 155 having components such as a bobbin portion that retains a drive coil (not shown in the figure). A voice coil motor 156 that is a type of linear motor is provided at the other end of the actuator arm 155. The voice coil motor 156 is configured of a drive coil (not shown in the figure), which is wound around the bobbin portion of the actuator arm 155, and a magnetic path formed of a permanent magnet and an opposing yoke that are disposed so as to sandwich the coil.

The actuator arm 155 is retained by ball bearings (not shown in the figure) at two locations at the top and bottom of the fixed shaft 157 so that it can rotate freely in answer to the voice coil motor 156.

In this case, a predetermined amount of floating is the between the medium-facing surface (ABS) of the head slider 153 and the surface of the magnetic disk 151.

Figure 20:
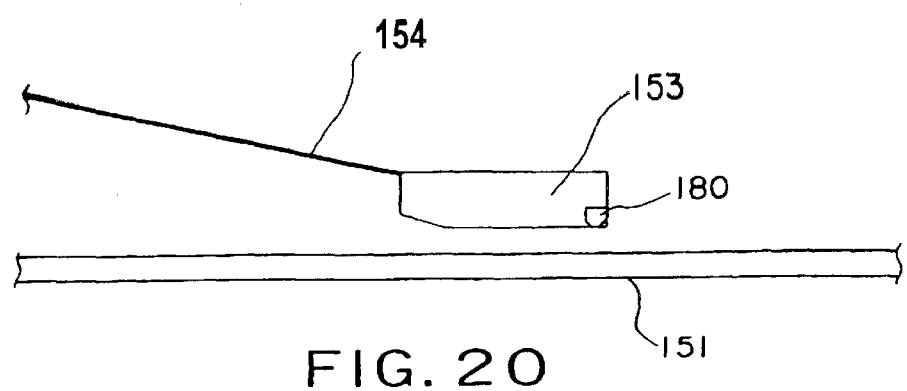
FIG. 20 is a schematic view of floating sliding.

A schematic view of the relationship between the head slider 153 and the magnetic disk 151 when the amount of floating is a predetermined positive value is shown in FIG. 20. As shown by way of example in this figure, in many magnetic recording/reproduction devices, the head slider 153 on which a magnetic head 180 is mounted moves in a state in which it floats at a predetermined distance from the surface of the magnetic disk 151. This "floating sliding" type of magnetic recording/reproduction device in accordance with this invention makes it possible to read data at a higher sensitivity and with a lower level of noise than in the prior art. In other words, it is possible to reproduce a signal flux from the magnetic disk 151 at a high level of sensitivity and also a low level of noise, by utilizing a magnetic head in accordance with any of the previously described embodiments. In other words, it is possible to implement a high level of output at a higher sensitivity, thus increasing the recording density. It is also possible to reduce even Barkhausen noise and record or reproduce a stabilized signal.

If the recording density is to be increased even further, on the other hand, it is necessary to lower the floating height and glide closer to the magnetic disk 151 to retrieve information. To obtain a recording density on the order of 100 gigabits per square inch, for example, spacing losses due to the floating itself would be too great, and the problem of crashing between the magnetic head 180 and the magnetic disk 151 can no longer be ignored.

For that reason, a converse method that could be considered would have the magnetic head 180 and the magnetic disk 151 placed in active contact and sliding in that state.

Figure 21:
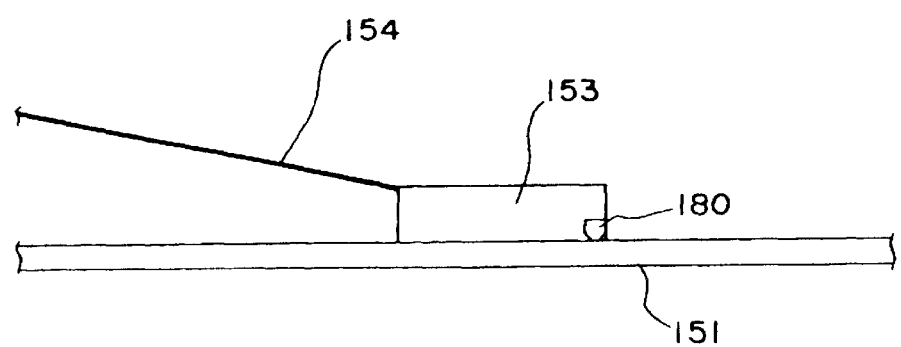
FIG. 21 is a schematic view of contact sliding.
Figure 22:
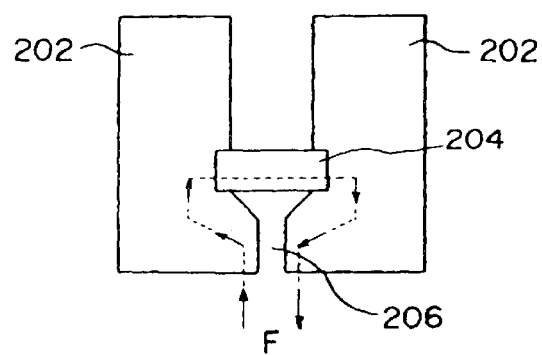
FIG. 22 is a schematic view of the structure of a yoke-type magnetic head.

A schematic view of the relationship between the head slider 153 and the magnetic disk 151 in this "contact sliding" type of motion is shown in FIG. 21. The magnetic head of this invention is provided with a magnetic yoke and the magneto-resistance effect element is separated from the magnetic disk by a predetermined height. It is therefore possible to solve the problem of damage caused by the magneto-resistance effect element coming into contact with the magnetic disk, even in the "contact sliding" type of magnetic recording/reproduction device that is shown by way of example in FIG. 19. As a result, it becomes possible to perform stable recording and reproduction at even higher densities than in the prior art.

Embodiments of the present invention were described above with reference to specific examples thereof. However, it should be noted that this invention is not limited to these specific examples. For example, the granular magnetic film 3 that was described with reference to FIG. 4 could be interposed between a GMR element and a magnetic yoke having the maze domains that was described with reference to the second embodiment.

It is also possible to obtain combinations of the above effects by combining the various specific examples in various ways.

It should be noted that the magnetic recording/reproduction device that is exemplified in FIG. 19 is merely an example of the present invention and thus those skilled in the art can modify the design as suitable to obtain all other types of magnetic recording/reproduction devices in a similar manner, within the range of the invention as the out herein.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as the forth in the appended claims.

The entire disclosure of Japanese Patent Application No. H11-152858 filed on May 31, 1999 including specification, claims, drawings and summary is incorporated herein by reference in its entirety.

What is claimed is:

1. A magnetic head comprising:
   a magnetic yoke taking in a signal flux from a magnetic recording medium, the magnetic yoke having a first yoke member, a second yoke member and a magnetic gap, the magnetic gap being located between the first and second yoke members at a medium facing surface; and
   a magneto-resistance effect element disposed to have magnetic contact with the first and second magnetic yoke members and detecting the signal flux transferred from the magnetic yoke,
   at least one of the first and second magnetic yoke members having a granular magnetic film, the granular magnetic film transferring substantial part of the signal flux to the magneto-resistance effect element and having granular structure in which magnetic grains are dispersed within an electrical insulating matrix.

2. The magnetic head according to claim 1, wherein the first and second yoke members have a multi-layered structure, the multi-layered structure having the granular magnetic film and an antiferromagnetic film.

3. The magnetic head according to claim 2, wherein the granular magnetic film has a plurality of magnetic domains having randomly oriented main magnetization directions so that a uniform magnetic anisotropy is induced into the granular magnetic film.

4. The magnetic head according to claim 2, wherein the first and second yoke members are a pair of planar bodies disposed on substantially a same plane surface,
   the granular film included in the pair of planar bodies has a plurality of magnetic domains having magnetization directions substantially parallel to the plane surface so that a radial magnetic anisotropy is induced into the granular magnetic film.

5. A magnetic head comprising:
a magnetic yoke taking in a signal flux from a magnetic recording medium, the magnetic yoke having a first yoke member, a second yoke member and a magnetic gap, the magnetic gap being located between the first and second yoke members at a medium facing surface; and
a magneto resistance effect element disposed to have magnetic contact with the first and second magnetic yoke members and detecting the signal flux transferred from the magnetic yoke,
at lest one of the first and second magnetic yoke members having a granular magnetic film, the granular magnetic film transferring substantial part of the signal flux to the magneto-resistance effect element, and having a granular structure wherein a non-magnetic material surrounds magnetic metal particles.

6. The magnetic head according to claim 5, wherein the first and second yoke members have a multi-layered structure, the multi-layered structure having the granular magnetic film and an antiferromagnetic film.

7. The magnetic head according to claim 6, wherein the granular magnetic film has a plurality of magnetic domains having randomly oriented main magnetization directions so that a uniform magnetic anisotropy is induced into the granular magnetic film.

8. The magnetic head according to claim 6, wherein the first and second yoke members are a pair of planar bodies disposed on substantially a same plane surface,
the granular film included in the pair of planar bodies has a plurality of magnetic domains having magnetization directions substantially parallel to the plane surface so that a radial magnetic anisotropy is induced into the granular magnetic film.

9. A magnetic recording/reproduction device comprising a magnetic head reproducing information that is stored in a magnetic recording medium,
the magnetic head including:
a magnetic yoke taking in a signal flux from a magnetic recording medium, the magnetic yoke having a first yoke member, a second yoke member and a magnetic gap, the magnetic gap located between the first and second yoke members at a medium facing surface; and
a magneto resistance effect element disposed to have magnetic contact with the first and second magnetic yoke members and detecting the signal flux transferred from the magnetic yoke,
at least one of the first and second magnetic yoke members having a granular magnetic film, the granular magnetic film transferring substantial part of the signal flux to the magneto-resistance effect element and having a granular structure in which grains are dispersed within an electrical insulating matrix.

10. A magnetic recording/reproduction device comprising a magnetic head reproducing information that is stored in a magnetic recording medium,
the magnetic head including:
a magnetic yoke taking in a signal flux from a magnetic recording medium, the magnetic yoke having a first yoke member, a second yoke member and a magnetic gap, the magnetic gap being located between the first and second yoke members at a medium facing surface; and
a magneto-resistance effect element disposed to have magnetic contact with the first and second magnetic yoke members and detecting the signal flux transferred from the magnetic yoke,
at least one of the first and second magnetic yoke members having a granular magnetic film, the granular magnetic film transferring substantial part of the signal flux to the magneto-resistance effect element, and having a granular structure wherein a non-magnetic material surrounds magnetic metal particles.

* * * * *